United States Patent [19]
Harvell

[11] 3,895,710
[45] July 22, 1975

[54] DRILL AND BLADE HOLDER FOR PORTABLE ELECTRIC TOOL

[75] Inventor: Don L. Harvell, Greenville, S.C.

[73] Assignee: The Singer Company, New York, N.Y.

[22] Filed: Apr. 29, 1974

[21] Appl. No.: 465,229

[52] U.S. Cl................ 206/349; 206/379; 224/29 R; 248/311; 408/241
[51] Int. Cl.².......................................... B65D 85/54
[58] Field of Search ............ 206/379, 349; 408/241; 248/311, 312, 74 PB:71; 224/29 R, 29 B, 29 E, 28 B, 5 A

[56] References Cited
UNITED STATES PATENTS

| | | | |
|---|---|---|---|
| 2,824,651 | 2/1958 | Davis | 408/241 |
| 2,842,260 | 7/1958 | Molitor | 206/379 |
| 3,109,538 | 11/1963 | Boxer | 206/349 |
| 3,154,192 | 10/1964 | Cowley | 206/379 |
| 3,516,631 | 6/1970 | Santucci | 248/74 PB |
| 3,578,199 | 5/1971 | Duncan | 248/311 |

Primary Examiner—William T. Dixson, Jr.
Attorney, Agent, or Firm—Marshall J. Breen; Chester A. Williams, Jr.; Harold Weinstein

[57] ABSTRACT

A drill and blade holder for a portable electric tool comprises a one piece elongated receptacle molded integrally with a strap member extending from one wall thereof and at least one end cover. Cooperable locking means are provided at the free end of the strap member and on said one wall of the receptacle.

1 Claim, 9 Drawing Figures

PATENTED JUL 22 1975　　3,895,710

DRILL AND BLADE HOLDER FOR PORTABLE ELECTRIC TOOL

BACKGROUND OF THE INVENTION

Molded receptacles for various types of articles have been known heretofore. It has also been known to incorporate on such receptacles means for securing the receptacle to a movable device such as a golf cart in order, for example, that supply of beverage containers may be transported together with the golf cart.

In the field of portable electric tools it has been comnevtional to store drills and blades in a receptacle carried separately from the tool itself. This has proven to be inconvenient and it has not been uncommon for the tool operator to temporarily place the drill or blade on the floor or on a nearby ledge when it required replacement by a drill or blade of different size with consequent loss of the drill or blade due to misplacement of same since it was not returned to the permanent storage receptacle at the time of exchange due to the inconvenience involved. There has thus been a need for a portable drill and blade holder which can be attached to the electric tool for transport therewith. Such a receptacle, however, must be adaptable to the various types of portable electric tools which are in service. A two piece receptacle to be attached to the tool has been used; however it is utilizable effectively only with a very limited range of cord diameters, is somewhat unwieldy to handle, and suffers from the customary production, storage and shipping disadvantages inherent in multicomponent articles.

SUMMARY OF THE INVENTION

It is one object of the present invention to provide a drill and blade holder which can be attached to diverse types of portable electric tools for transport therewith.

It is another object of the invention to provide a drill and blade holder attachable to diverse types of portable electric tools which can be easily and economically produced.

It is still another object of this invention to provide a drill and blade holder attachable to diverse types of portable electric tools and readily positionable with respect to the tool in any convenient location.

A further object of the invention is the provision of a drill and blade holder which can be employed with portable electric tools having a substantially wide range of cord diameters.

Other objects and advantages of the invention will become readily apparent from the following description of the invention.

According to the present invention there is provided a drill and blade holder for a portable electric tool comprising:

a. a one piece molded elongated receptacle having at least one end cover pivotably connected thereto;

b. a strap member comprising at least one relatively thin, flexible strap element extending freely from a pedestal base formed integrally with one wall of said receptacle having first locking means formed at its free end; and c. second locking means formed on said one wall of the receptacle integral therewith and cooperable with said first locking means to retain a length of the electrical power supply cord for said tool therebetween.

BRIEF DESCRIPTION OF THE DRAWINGS

In order that the invention may be more fully comprehended it will now be described, by way of example, with reference to the accompanying drawing in which.

DETAILED DESCRIPTION OF THE INVENTION

Figure 1:
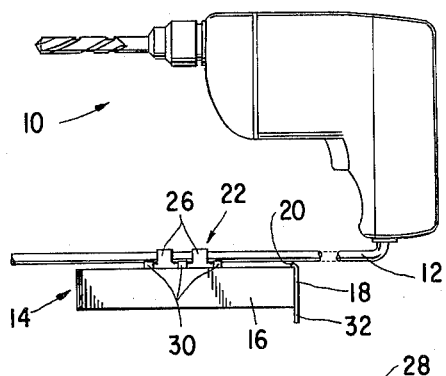
FIG. 1 is a side elevational view of a portable electric drill with the drill and blade holder of this invention attached thereto.

Referring to the drawing, there is shown a portable electric tool 10 in the form of a drill. An electric cord 12 connects the drill to an electrical supply source not shown. The drill and blade holder 14 is depicted as being attached to an intermediate section of the cord 12. As will become clear from the ensuing description, the holder 14 may be secured to the cord at any convenient location along its length.

Figure 2:
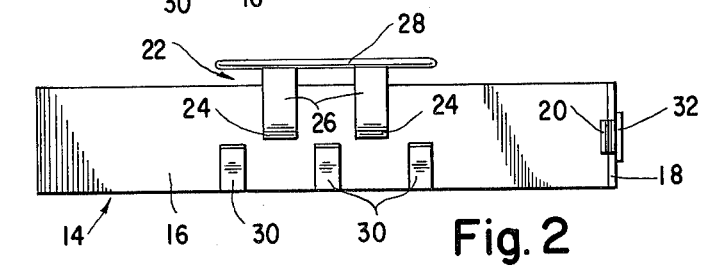
FIG. 2 is a top plan view of the drill and blade holder with the strap member in its unlocked position.
Figure 3:
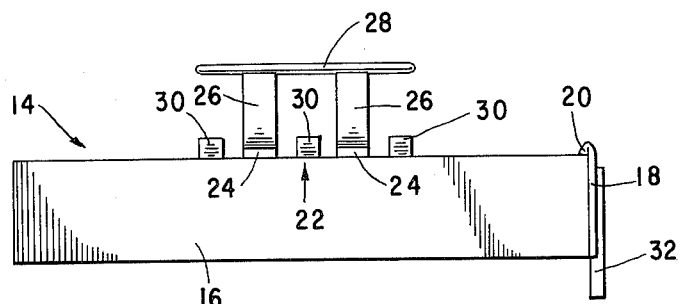
FIG. 3 is a side elevational view of the drill and blade holder with the strap member in its unlocked position.
Figure 4:
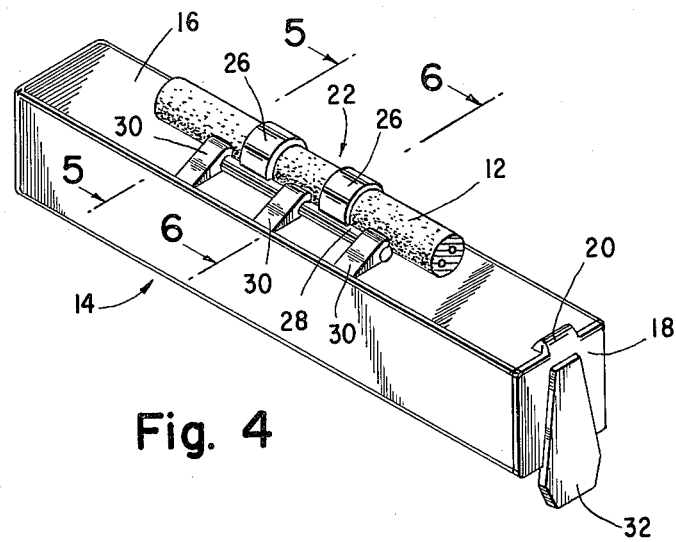
FIG. 4 is a perspective view of the drill and blade holder attached to the power cord of a portable electric tool.

As shown more clearly in FIGS. 2, 3 and 4, the holder comprises a generally elongated hollow receptacle 16 which is provided at one end thereof with a cover 18 pivotally connected to the receptacle by means of an integral hinge 20. The receptacle is also provided on one wall thereof with a strap member 22 which includes a pedestal base 24 formed integrally with the receptacle and a freely extending relatively thin flexible strap element 26. Preferably at least two of such bases and strap elements are provided. The upper surface of the pedestal base is preferably contoured so as to present a concave upwardly facing surface. This surface thus provides a convenient seat for the cord 12 when attaching the holder 14 to the tool 10. At the free end of the strap element there is formed an elongated locking rod or bar 28 which is joined to the free ends of all of the strap elements. The locking bar is dimensioned so as to cooperate with one or more upstanding locking projections 30 formed on the same wall of the receptacle as bases 24. The projections 30 are spaced from the bases 24 transversely of the common wall of the receptacle and they are preferably offset from such bases in a longitudinal direction. The surfaces of the projections 30 confronting bases 24 are desirably given a concave contour to facilitate reception of the locking bar 28 thereagainst when the holder is attached to the cord. A presently preferred construction utilizes one more projection 30 than the number of strap elements. An advantage of this arrangement is that when employing the holder with oversized cords it is possible to utilize an intermediate locking projection 30 as a fulcrum about which the locking bar can be flexed to permit cooperable latching of the locking bar with the remaining locking projections. It will be recognized, of course, that optimum locking is not achieved in this manner.

However, it does allow for use of the holder with cords having diameters exceeding those for which the holder is originally intended.

To provide for ease of manufacture, economy, and in order also to obtain the desired strength and flexibility characteristics, the holder 14 is molded of a suitable plastic material in one piece. The cover 18, strap member 22 and locking projections 30 are all integrally molded with the receptacle. Integral hinge 20 can be formed subsequent to the molding step by mere flexing which causes molecular orientation along the line of flexure. The formation of such integral hinges is well known. For convenience in opening and closing the cover 18 a tab 32 may be made part of same extending beyond the surface of the adjacent wall of the receptacle.

Figure 5:
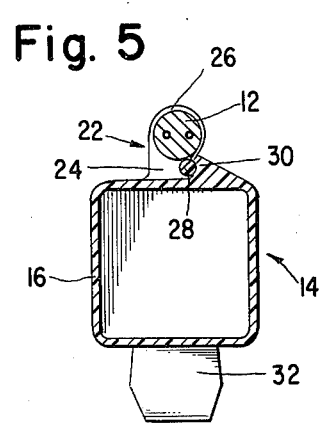
FIG. 5 is a cross-sectional view of the drill and blade holder taken along line 5—5 of FIG. 4.
Figure 6:
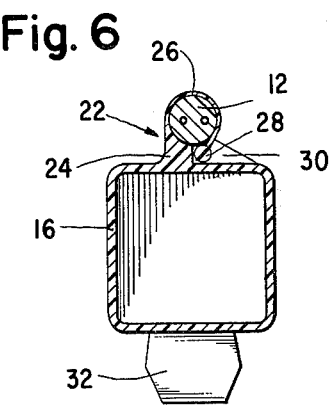
FIG. 6 is a cross-sectional view of the drill and blade holder taken along line 6—6 of FIG. 4.

FIGS. 5 and 6 respectively show the seating of the cord 12 on the upper surface of the pedestal base 24 and the nesting of the locking bar 28 against the contoured surface of the upstanding projection 30. This double nesting feature assures maintenance of the attachment of the holder 14 to cord 12 despite movement of the cord and the power tool in the normal course of its use.

Figure 7:
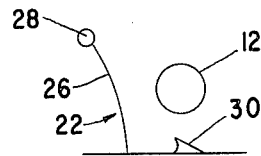
FIGS. 7, 8 and 9 are diagrammatic views showing the stepwise locking of the strap member about the power cord.
Figure 8:
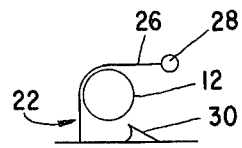
Figure 9:
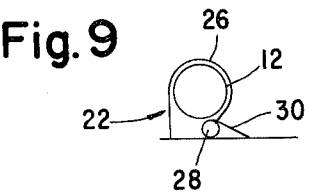

FIGS. 7, 8 and 9 may be referred to for a clear understanding of the ease with which the strap member 22 may be wrapped about cord 12 and locked in place by the cooperation of the locking bar 28 and upstanding projection 30.

For the further convenience of the tool operator the receptacle, when molded, may be provided on selected wall surfaces with information such as (a) saw blade use chart specifying catalog number of the blade, number of teeth and recommended use and/or (b) a drill size chart with raised comparison pads for the various drill sizes.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A drill and blade holder for attachment to a variably sized cord of a portable electric power tool comprising:
   a. a one piece molded elongated receptacle having a plurality of walls and a pivotally connected end cover,
   b. a strap means including a pair of pedestal bases integrally formed on the exterior of one of the walls in spaced relation to each other, a thin flexible strap element extending from each of the pedestal bases, and a locking bar extending parallel to the wall integrally connected at the ends of the strap elements intermediate the free ends of the locking bar,
   c. a plurality of locking projections formed integrally with the wall and spaced from each other along the length of the wall a total distance substantially equal to the length of the locking bar,
   d. each of the locking projections spaced with respect to the pedestal bases alternately along the length of the wall, and
   e. the locking bar to successively engage the locking projections upon the strap elements encircling the cord to be interconnected therewith, whereby said holder will be attached to the cord.

* * * * *